(12) United States Patent
Bright

(10) Patent No.: US 6,745,986 B1
(45) Date of Patent: Jun. 8, 2004

(54) SUPPORT APPARATUS AND METHOD

(76) Inventor: Gregory David Bright, 410 Hazeltine, Austin, TX (US) 78734

( * ) Notice: Subject to any disclaimer, the term of this patent is extended or adjusted under 35 U.S.C. 154(b) by 0 days.

(21) Appl. No.: 10/338,232

(22) Filed: Jan. 8, 2003

(51) Int. Cl.[7] .................. A47B 91/00; A47G 29/00; B65D 19/00
(52) U.S. Cl. .............. 248/346.01; 248/918; 108/50.01
(58) Field of Search .................. 248/346.01, 118, 248/118.5, 346.5, 918, 676; 108/43, 44, 45, 50.01, 137; 400/715, 717, 718

(56) References Cited

U.S. PATENT DOCUMENTS

| | | | | |
|---|---|---|---|---|
| 4,313,112 A | * | 1/1982 | Foster | 248/639 |
| 4,482,063 A | * | 11/1984 | Berke et al. | 211/69.1 |
| 4,483,572 A | * | 11/1984 | Story | 312/196 |
| 4,511,111 A | * | 4/1985 | Godfrey | 248/459 |
| D309,300 S | * | 7/1990 | Lindgren, Jr. | D14/114 |
| 5,183,230 A | * | 2/1993 | Walker et al. | 248/118 |
| 5,464,292 A | * | 11/1995 | Grant | 400/715 |
| 5,470,041 A | | 11/1995 | Cucinotta | |
| 5,732,910 A | | 3/1998 | Martin | |
| 5,822,185 A | | 10/1998 | Cavello | |
| 5,915,661 A | | 6/1999 | Silverman et al. | |
| 5,927,669 A | * | 7/1999 | Sassman | 248/346.01 |
| 6,044,758 A | | 4/2000 | Drake | |
| 6,164,213 A | | 12/2000 | Topps et al. | |
| 6,256,193 B1 | | 7/2001 | Janik et al. | |
| 6,305,652 B1 | | 10/2001 | Borke et al. | |
| 6,354,658 B1 | | 3/2002 | Sher et al. | |
| 6,367,748 B1 | * | 4/2002 | Solomon et al. | 248/129 |
| 6,426,870 B1 | | 7/2002 | Oross et al. | |
| 6,474,614 B2 | | 11/2002 | MacEachern | |
| 6,568,650 B2 | * | 5/2003 | Helmetsie et al. | 248/678 |

* cited by examiner

*Primary Examiner*—Gwendolyn Baxter
(74) *Attorney, Agent, or Firm*—J. Nevin Shaffer, Jr.

(57) ABSTRACT

A support apparatus and method includes, for a surface with an edge, an unbound base resting on the surface with an edge. An angled face is connected to the unbound base. The connection of the angled face creates an edge receiving notch and the edge receiving notch is conformed to receive the edge of the surface and support and extend the angled face beyond the edge of the surface.

23 Claims, 3 Drawing Sheets

SUPPORT APPARATUS AND METHOD

FIELD OF THE INVENTION

This invention relates to a support apparatus and method. In particular, according to one embodiment, the invention relates to a support apparatus for use with a surface with an edge. An unbound base includes an angled face. The angled face connection creates an edge receiving notch. The edge receiving notch is conformed to receive the edge of the surface and support and extend the angled face beyond the edge of the surface.

BACKGROUND OF THE INVENTION

There is no doubt that technology has greatly enhanced the ability of individuals to accomplish more tasks more efficiently than ever before. The increased use of these technologically advanced devices at home and in the workplace, however, has created new problems and added new difficulties for users of these devices.

For purposes of example only, and not by limitation, a typical work surface height does not allow for proper ergonomics when using devices, such as data entry-input/output devices such as laptops, tablet PCs, and the like, from a sitting or a standing position. In particular, the typical height of a desktop work surface area positions devices at a level which does not allow the recommended horizontal positioning (perpendicular to the torso) of the forearms, when entering data, and so forth, because unrecommended erect seating is employed. In this position, the forearms of a user have to be angled upward from the torso to reach over the work surface area to input data.

Angled forearms cause a smaller elbow angle, thereby decreasing circulation and compressing nerves. An associated problem is that, as a result of this position, a user's wrists have to be hyper-extended downward to reach the device in order to enter data, for example. A still further problem associated with the prior art, is that the back, shoulders and neck of a user have to be hunched (craned) over to accommodate the downward angle of the wrists and to see and operate the device.

Modern chairs associated with home and work surfaces are incorporating several features that encourage a reclined working position. The term "counter balanced seating" refers to seating that cradles the back, putting a vertical and horizontal multidirectional support along the entire back to relieve spine compression. Reclining offers several advantages to the prior art required position for operation of devices. The reclining positioned allows the forearms to be positioned perpendicular to the torso. As a result, the wrists, therefore, are at their neutral position in relation to the device. The back is cradled in this reclining positioned thereby relieving compression stress on the spine. This cradled position allows a user to take full advantage of the lumbar support in modern chairs. Reclining also opens the abdominal angle (between the torso and legs) for better blood circulation. Additionaly, the popliteal angle (behind the knee) is opened as well providing better circulation in the legs. Additionally, reclining allows the spine to conform to its natural s-shaped position. Other features of modern chairs also facilitate use of the Applicant's device in that the arms of the chairs may also be adjustable so that they may be located in best relation to the support.

An additional problem exists with users of modern devices in the normal home and office workplace. Most modern devices have some sort of material on the bottom of the device intended to secure them to the surface. Rubberized feet are common. The problem is that this makes the device difficult to move around the surface when not needed or for minor adjustments to shift the body of the user for better circulation. That is to say, prior art devices which are stationery in nature and are not easily moved, do not allow the user to easily change the effective seating, or standing, positions, thus causing poor circulation and pressure points.

In addition to the difficulty in moving and relocating devices along a horizontal plane, another common prior art problem with the operation of a device on a surface is that the vertical location of the device, such as the display screen on a portable computer or tablet PC, is often at improper viewing levels. Typically, they are too low thus causing stress on the neck from bending down and, again, are difficult to adjust.

Many prior art devices do exist for aiding in the use of modern devices. Representative of these are U.S. patents: U.S. Pat. Nos. 6,354, 658 B 1; 6,113,050; 5,822,185; and 5,111,361. A primary objective of these prior art devices is to secure it in place so that it does not move during the use of the device attached to it. Again rubberized feet, to prevent movement during use of the device, are common as are clamps and other complicated attachment devices. Thus, the prior art devices, while designed to solve some problems associated with the use of devices on a surface, create other problems in their complexity and in the inability to be rapidly moved from one place to another on the surface. An associated problem is that, while some of the prior art devices allow for use of a device beyond the edge of a surface, these devices require complicated clamps and the like and are not, again, easily moved.

SUMMARY OF THE INVENTION

The support apparatus and method of the present invention includes, for a surface with an edge, an unbound base resting on the surface with an edge. An angled face is connected to the unbound base such that the connection of the angled face to the unbound base creates an edge receiving notch. The edge receiving notch is conformed to receive the edge of the surface and support and extend the angled face beyond the edge of the surface. According to one embodiment, the unbound base further includes at least one lateral movement device attached to the unbound base for moving the unbound base laterally while resisting movement backwards and forwards.

DETAILED DESCRIPTION OF THE INVENTION

Figure 1:
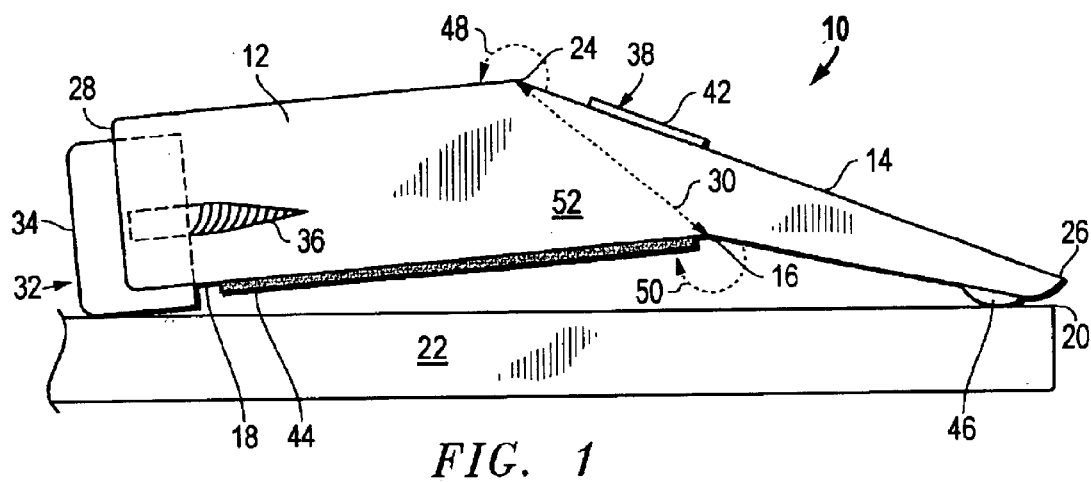
FIG. 1 is a side view of the support apparatus according to one embodiment of the present invention.

An embodiment of the present invention is illustrated by way of example in FIGS. 1–6. With specific reference to FIG. 1, the support apparatus 10 according to one embodiment of the present invention includes an unbound base 12. Unbound base 12 includes an angled face 14. Angled face 14 is connected to unbound base 12 such that an edge receiving notch 16 is created on the bottom 18 of unbound base 12. As more clearly shown in FIG. 2, edge receiving notch 16 cooperates with an edge 20 of a surface 22 as will be more fully described hereafter.

As used herein, the term "unbound" is meant to define a base 12 that is not clamped, tied, or secured to the surface or elsewhere by any other means except its own weight. The force of gravity alone is utilized to locate the support apparatus 10 of the present invention where desired. Thereafter, the weight of the unbound base 12 in combination with a lateral movement device 32 and nonskid material 44, in appropriate situations as discussed hereafter, enable the support apparatus 10 to resist movement as well.

As clearly illustrated in FIG. 1, angled face 14 has a first end 24 and a second end 26. Angled face 14 is connected to unbound base 12 such that the first end 24 of angled face 14 extends past the edge receiving notch 16 towards the back 28 of unbound base 12. Further, the second end 26 of angled face 14 extends past the edge receiving notch 16 and beyond the front 30 of unbound base 12. As described herein, angled face 14 is connected to unbound base 12. According to one embodiment, however, support apparatus 10 is a monolithic polyhedron. A monolithic design is useful for ease of manufacturer, simplicity and ruggedness. In any event, angled face 14 extends over edge receiving notch 16 in the direction towards the back 28 of unbound base 12 and the front 30. The front 30 ending at the beginning of edge receiving notch 16.

FIG. 1 also illustrates another embodiment of the invention including a lateral movement device 32. Lateral movement device 32 may be any device now known or hereafter developed for moving support apparatus 10 in a lateral direction. According to one embodiment, lateral movement device 32 is a rubberized, sticky wheel 34. Rubberized, sticky wheel 34 is connected, according to one embodiment, to the back 28 of unbound base 12. Rubberized, sticky wheel 34 may be connected to unbound base 12 by any means now known or hereafter developed, including a screw 36. As is known in the art, screw 36 is used to connect rubberized, sticky wheel 34 to the back 28 of unbound base 12 while at the same time enabling rubberized sticky wheel 34 to freely rotate in a lateral, side to side motion. Accordingly, however, the rubberized, sticky wheel 34 enables unbound base 12 to successfully resist movement in the direction towards the back 28 and/or of the front 30. As more clearly shown in FIGS. 3 and 4, according to one embodiment, two wheels 34 are attached to the back 28 of unbound base 12. Wheels 34 may be ball rollers or any other type of lateral movement device 32 that enables lateral movement while resisting movement from side to side.

Figure 5:
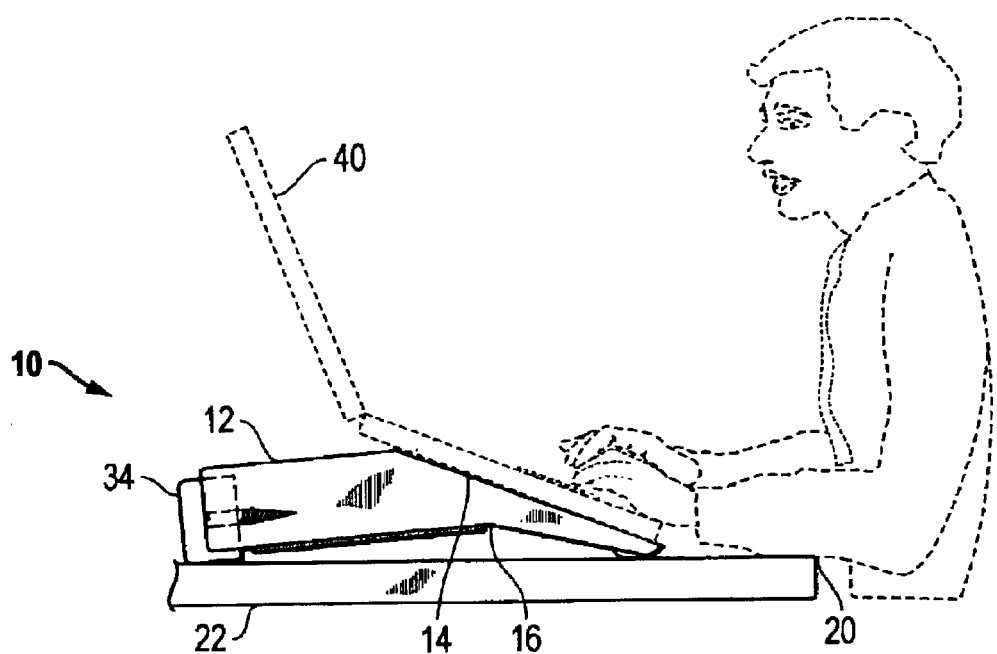
FIG. 5 is a side view of the embodiment of FIG. 1 in use on a surface.
Figure 6:
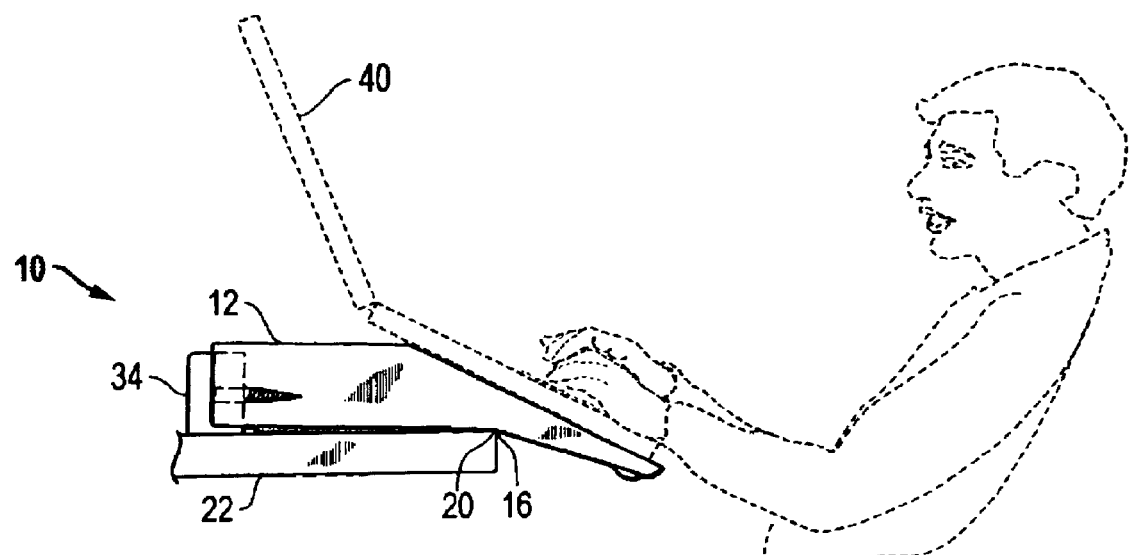
FIG. 6 is a side view of the embodiment of FIG. 1 in use on the edge of a surface by a user in a reclined position.

Still referring to FIG. 1, according to one embodiment of the invention, an attachment device 38 is connected to angled face 14 for the attachment of a device 40, such as a laptop computer or any other known device or device developed hereafter (as shown in FIGS. 5 and 6). The attachment device 38, according to one embodiment, is a combination of hook and loop material 42 attached in combination to the angled face 14 and to the device 40 in a manner well-known in the art. Any attachment device 38 now known or hereafter developed serving the purpose of the invention is suitable, such as, for example and not by limitation, a raised lip or edge (not shown) along the bottom of the second end 26 of angled face 14.

Figure 2:
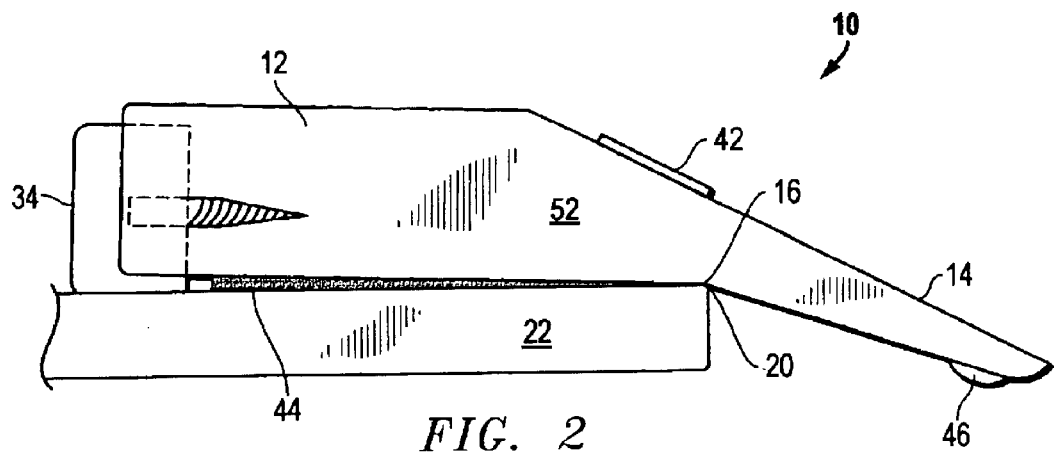
FIG. 2 is a side view of the embodiment of FIG. 1 shown with the edge receiving notch in position on the edge of a surface.

FIG. 1 also illustrates another embodiment of the invention wherein a nonskid material 44 is attached to the bottom 18 of unbound base 12 from approximately the back 28 up to approximately the edge receiving notch 16 and/or the front 30 of unbound base 12. Nonskid material 44 co-operates with the heavy, weighted, unbound base 12 to retain unbound base 12 in position when support apparatus 10 is utilized as illustrated in FIG. 2, as will be discussed more fully hereafter. Nonskid material 44 may be rubber, plastic, or any other slip resistant material now known or hereafter developed.

Figure 4:
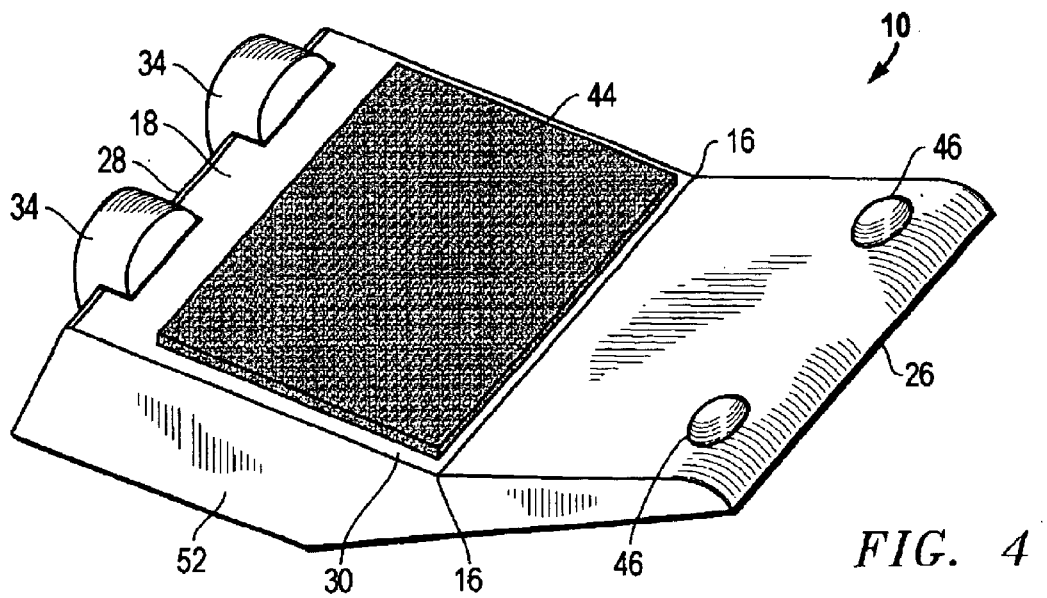
FIG. 4 is a bottom perspective view of the embodiment of FIG. 1.

Raised rest 46, according to one embodiment, is attached to the second end 26 of angled face 14. As illustrated in FIG. 4, according to one embodiment, a pair of raised rests 46 are utilized. Raised rest 46 serves to raise the second end 26 of angled face 14 slightly above the surface 22 as also shown in FIG. 5. This enables a user to slip his or her fingers between the surface 22 and the second end 26 of angled face 14 so as to grasp support apparatus 10 and lift the raised rest 46 off of surface 22. As will be discussed more fully hereafter, in this position, the user may easily move support apparatus 10 around the surface 22 by utilizing a side to side, zig-zag motion. This zig-zag motion is familiar to any person who ever used a two wheeled hand dolly.

As best seen in FIG. 1, angled face 14 creates an angle 48 with relation to the unbound base 12. Additionaly, as previously discussed, angled face 14 creates an angle 50 resulting in the creation of edge receiving notch 16. Obviously, angle 48 and angle 50 are susceptible to modification and variation according to the uses and desires of the individual. For example only, and not by limitation, it is well within the skill of those of ordinary skill in the art to create a movable joint at angle 48 and angle 50 such that these angles may be adjusted in place by a user.

Further, it can be observed from FIG. 1, that angled face 14, according to one embodiment of the invention, tapers in width from the first end 24 to the second end 26. This is in keeping with the aspect of the invention whereby unbound base 12 is created from material heavy enough to support the support apparatus 10 in position on surface 22 when support apparatus 10 is utilized as illustrated in FIGS. 2 and 6. That is to say, unbound base 12, according to the invention, must be sufficiently heavy to support a device 40 in the cantilevered position illustrated in FIGS. 2 and 6 and hereafter disclosed and described. This weighted factor may be achieved, again, by the selection of a sufficiently heavy material to create unbound base 12 in the first place, or by the addition of additional weights, such as, for example only and not by limitation, screw 36 or by any other means now known or hereafter developed Referring now to FIG. 2, support apparatus 10 is shown in position on surface 22 such that angled face 14 is supported by, and extended beyond, the edge 20. According to this embodiment, edge receiving notch 16 receives edge 20 such that the bottom 18 of unbound base 12 rests essentially completely on the surface 22. In this case, nonskid material 44, as previously discussed, helps secure unbound base 12 in location. Additionally, lateral movement device 32, rubberized, sticky wheels 34 according to one embodiment, enable unbound base 12 to move side to side but mist movement towards the back 28 or the front 30. That is to say, unbound base 12 has a pair of sides 52. Lateral movement device 32 allows support apparatus 10 to be moved in the direction of the sides 52 of unbound base 12 but resists movement in the direction of either the back 28 or the front 30 of unbound base 12, as previously described.

Figure 3:
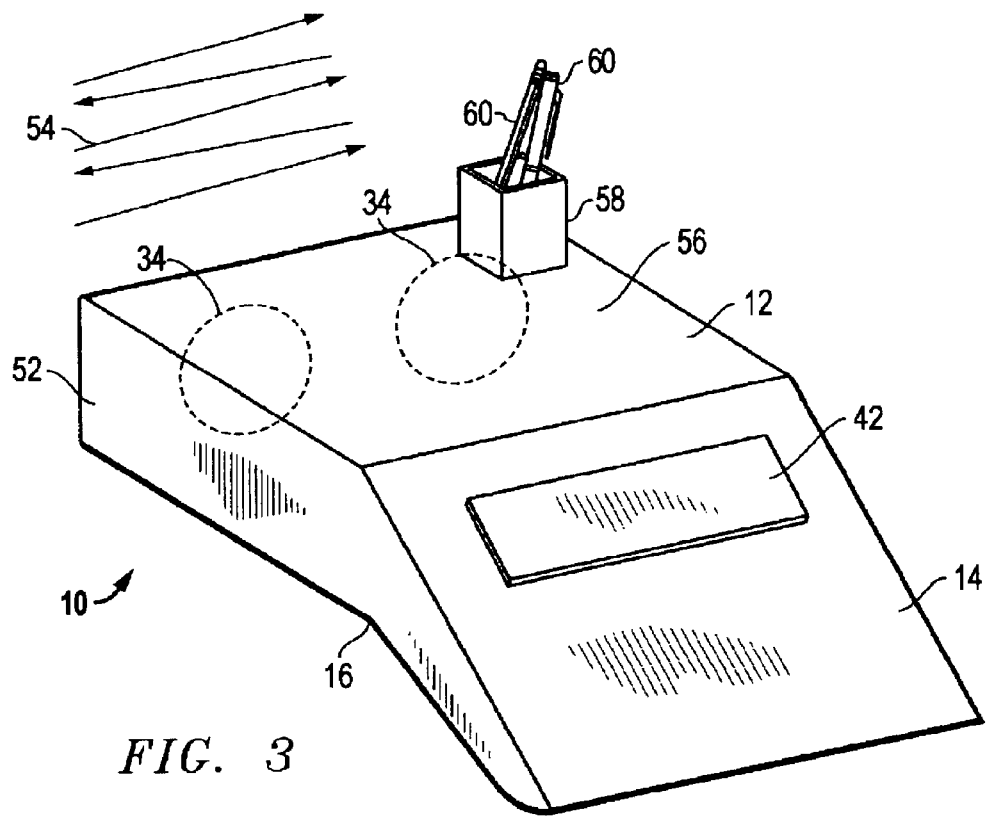
FIG. 3 is a left perspective view of the embodiment of FIG. 1.

In this position, when a user decides to move support apparatus 10, the user grasps overhanging second end 26 of angled face 14 and lifts it up. As a result, the bottom 18, including nonskid material 44 is lifted off of surface 22. At that point, only lateral movement device 32 of support apparatus 10 is in contact with surface 22. A user then simply manipulates support apparatus 10 in a zig zag motion as illustrated by arrows 54 as shown in FIG. 3. This side to side motion is facilitated, as previously described, by the lateral movement device 32 such that support apparatus 10 can be easily and quickly maneuvered around the surface 22 either into or out of position for use.

FIG. 3 also illustrates the support apparatus 10 according to another embodiment wherein the top 56 of unbound base 12 is utilized to support a box 58 containing writing implements 60. Certainly, any other types of convenient accessories for device 40, such as paper, paper clips, tape, and so forth can be easily accommodated by support apparatus 10.

The position of support apparatus 10 as illustrated in FIGS. 2 and 6, enables a user to sit in a reclined position thereby achieving the benefits of the reclined position as previously discussed.

FIG. 4 is a bottom perspective view of the support apparatus 10 according to one embodiment. Nonskid material 44 is shown attached to the bottom 18 of unbound base 12. Additionally, lateral movement device 32, in the form of a pair of rubberized, sticky wheels 34, are shown connected to the back 28 of unbound base 12. Notch 16 is formed at the front 30 of unbound base 12 by angled face 14. Raised rests 46 are shown oppositely positioned on the second end 26 of the bottom of angled face 14. As previously described, raised rests 46 enable a user to lift the second end 26 of angled face 14 off of surface 22. According to one embodiment, raised rests 46 are thin, non-stick glides. As a result, when support apparatus 10 is in the position shown in FIGS. 1 and 5, all that is necessary to maneuver support apparatus 10 is to move it in the zig-zag motion without actually having to lift support apparatus 10 off of the support 22. In fact, if all that is desired is to move the support apparatus sideways, it may be simply slid laterally with very little effort.

Referring now to FIG. 5, the use of support apparatus 10 on the surface 22 is illustrated. In this situation a user has easily maneuvered support apparatus 10 to a position away from the edge 20 such that the user's forearms are essentially perpendicular to his torso and his wrists are in a natural comfortable position. Additionally device 40 is in a raised position above the surface 22 such that the user does not have to crane his neck down in order to view the laptop screen of device 40.

Referring now to FIG. 6, a user has easily maneuvered support 10 such that edge receiving notch 16 captures edge 20 and the angled surface 14 is extended beyond edge 20. In this position, a user is free to fully recline while still maintaining his arms at a perpendicular or greater angle to his torso and keeping his wrists in a relaxed, natural position for use with the keyboard of device 40. Again, the monitor/screen of device 40 is at head level such that a user does not have to crane his neck down to view his work.

The description of the present embodiments of the invention has been presented for purposes of the illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

What is claimed is:

1. For a surface with an edge, a support apparatus comprising:
   (a) a self-supporting unbound base resting on a surface with an edge;
   (b) an angled face connected to said self-supporting unbound base, said connection of said angled face creating an edge receiving notch;
   (c) said edge receiving notch conformed to receive said edge of said surface and thereby to support and extend said angled face beyond said edge of said surface; and
   (d) at least one lateral movement means attached to said self-supporting unbound base for moving said self-supporting unbound base laterally while resisting movement backwards and forwards.

2. The apparatus of claim 1, wherein said at least one lateral movement means comprising two wheels attached to said self-supporting unbound base, said two wheels attached so as to allow lateral movement of said self-supporting unbound base and so as to resist backward end forward movement of said self-supporting unbound base.

3. The apparatus of claim 2 wherein said two wheels are attached to said self-supporting unbound base opposite from said angled face.

4. The apparatus of claim 1 further comprising non-skid material attached to the bottom of said self-supporting unbound base.

5. The apparatus of claim 1 further comprising attachment means connected to said angled face for holding a device in place on said angled face.

6. The apparatus of claim 5 wherein said attachment means is a combination of hook and loop material connected to said angled face and said device.

7. The apparatus of claim 1 further comprising a raised rest attached to said angled face.

8. The apparatus of claim 7 wherein said raised rest comprises a pair of raised rests attached to said angled face opposite from said angled face attachment to said self-supporting unbound base.

9. The apparatus of claim 1 wherein said self-supporting unbound base is weighted.

10. For a surface with an edge, a support apparatus for supporting a device above the surface and beyond the edge, the apparatus comprising:
    (a) an unbound base with a front and a back and a top and a bottom and two sides;
    (b) an angled face with a first end and a second end, the first end connected to the unbound base along the front of the unbound base, the connection creating an edge receiving notch in the bottom of the unbound base;
    (c) the edge receiving notch conformed to receive the edge of the surface such that the second end of the angled face is supported beyond the edge of the surface; and
    (d) at least one lateral movement means for moving the unbound base laterally while resisting movement towards the front and the back of the unbound base connected to the back of the unbound base and such that the unbound base is supported above the surface by the at least one lateral movement means.

11. The apparatus of claim 10 wherein the unbound base further includes a non-slip material attached to the bottom of the unbound base.

12. The apparatus of claim 10 wherein the unbound base is weighted.

13. The apparatus of claim 10 wherein the angled face further includes a device retainer.

14. The apparatus of claim 13 wherein the device retainer comprises a combination of hook and loop material attached to the angled face and the device.

15. The apparatus of claim 10 wherein the angled face further includes at least one raised rest attached to the second end.

16. The apparatus of claim 10 wherein the angled face is connected to the unbound base such that the first end of the angled face extends past the edge receiving notch towards the back of the unbound base and the second end extends past the edge receiving notch beyond the front of the unbound base.

17. The apparatus of claim 10 wherein the angled face tapers in thickness from the first end to the second end.

18. The apparatus of claim 10 wherein the at least one lateral movement means comprises a pair of wheels attached to the back of the unbound base.

19. The apparatus of claim 18 wherein the wheels are tacky, rubberized wheels.

20. For a work surface, a support apparatus for supporting a device at an angle above the work surface, the apparatus comprising:
    (a) an unbound base with a front, a back, a top, a bottom, and two sides;
    (b) a lateral movement means for moving the unbound base from side to side while resisting movement in the direction of the front and the back of the unbound base; and
    (c) an angled face attached to the front of the unbound base.

21. The apparatus of claim 20 wherein the lateral movement means comprises a pair of wheels connected to the unbound base.

22. For a surface with an edge, a method of supporting a device at an angle above the surface and beyond the edge, the method comprising the steps of:
    (a) providing an unbound base with a front and a back and a top and a bottom and two sides;
    (b) connecting an angled face, with a first end and a second end, at the first end to the front of the unbound base such that the connection creates an edge receiving notch;
    (c) conforming the edge receiving notch to receive the edge of the surface such that the angled face is supported and extends beyond the edge of the surface;
    (d) attaching a lateral movement device to the unbound base such that the lateral movement device enables side to side movement and resists movement in a direction of the front and the back of the unbound base; and
    (e) connecting the device to the angled face.

23. The method of claim 22 further comprising the steps of:
    (a) lifting the front end of the angled face;
    (b) moving the unbound base in a zig-zag, side to side, motion to position the edge receiving notch over the edge; and
    (c) fitting the edge of the surface into the edge receiving notch.

* * * * *